US010516599B1

(12) United States Patent
Sebastian et al.

(10) Patent No.: US 10,516,599 B1
(45) Date of Patent: Dec. 24, 2019

(54) LINK PRIORITY FOR LOOP-PROTECT

(71) Applicant: HEWLETT PACKARD ENTERPRISE DEVELOPMENT LP, Houston, TX (US)

(72) Inventors: Celestian Kaniampady Sebastian, Karnataka (IN); Vijeesh Erankotte Panayamthatta, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/118,619

(22) Filed: Aug. 31, 2018

(51) Int. Cl.
*H04L 12/26* (2006.01)
*H04L 12/705* (2013.01)
*H04L 12/939* (2013.01)

(52) U.S. Cl.
CPC ............ *H04L 45/18* (2013.01); *H04L 43/50* (2013.01); *H04L 49/555* (2013.01); *H04L 49/557* (2013.01)

(58) Field of Classification Search
CPC ......... H04L 45/18; H04L 45/48; H04L 45/00; H04L 12/462; H04L 12/437
See application file for complete search history.

(56) References Cited

U.S. PATENT DOCUMENTS

| 9,007,958 B2 | 4/2015 | Gupta et al. |
| 2013/0163596 A1 | 6/2013 | Zhang |
| 2015/0103674 A1* | 4/2015 | Ramesh ............ H04L 41/12 370/244 |
| 2016/0149799 A1 | 5/2016 | Yu et al. |
| 2018/0102944 A1 | 4/2018 | Mishra et al. |

FOREIGN PATENT DOCUMENTS

WO  WO-2016135828  9/2016

OTHER PUBLICATIONS

Switching Feature Overview and Configuration Guide, (Research Paper), Retrieved Aug. 30, 2018, 21 Pgs.
Understanding Loop Protection for STP, RSTP, VSTP, and MSTP on EX Series Switches, (Web Page), Jun. 11, 2018, 2 Pgs.

* cited by examiner

*Primary Examiner* — Jamal Javaid
(74) *Attorney, Agent, or Firm* — Nolte Intellectual Property Law Group (57) ABSTRACT

This disclosure is directed to a method, system, and device for disabling links within a computer network based on a loop link priority parameter. The method includes detecting a loop in a network in a network communication device having multiple interfaces associated with different priorities. The device may transmit a first network packet as a loop check packet outbound from the network communication device via a first interface port. The device may then receive a second network packet (which may be the first outbound packet returning inappropriately to the device) as an inbound network communication via a second interface port. If the device identifies return of a sent loop check packet, it may disable one of the first interface port or the second interface port based on a comparison of loop link priority parameters to remove the loop in the network.

20 Claims, 10 Drawing Sheets

LINK PRIORITY FOR LOOP-PROTECT

BACKGROUND

In the field of network computing, multiple computers or systems may be designed to work as a group to provide functionality and redundancy for a distributed network application or environment. A distributed network environment generally refers to an environment where multiple computers share information amongst each other through a network communication mechanism. Typical network communication mechanisms include transport control protocol (TCP) Internet protocol (IP) networks, and session initiation protocol (SIP) networks. Other transport protocols also exist. In general, transport protocols define a standard for how different systems communicate with each other over the physical (e.g., wired networks or wireless transport) layer of the network. Other communication protocols (e.g., hypertext transport protocol (HTTP), file transport protocol (FTP), etc.) also exist at an application layer, to define how client applications and server applications communicate with each other. This application layer is generally a layer above the physical communication transport layer in accordance with the open systems interconnect (OSI) network model. By "connecting" different computer systems together those computer systems (and applications executing on them) may work together to execute different functional components of a distributed network application (e.g., distributed application). That is, in a distributed application, different computer systems may provide different types of functionality for the overall application or may serve as redundant components for a given functional component.

A Switching loop or bridge loop occurs in computer networks when there is more than one Layer 2 (based on the open systems interconnect (OSI) model) path between two endpoints (e.g., multiple connections between two network switches or two ports on the same switch connected to each other). The loop, if not properly detected and disabled (e.g., by disabling an incorrectly connected port), creates broadcast storms on the computer network. This is because broadcasts and muiticasts are, by default, forwarded by switches out every port. The switch or switches will repeatedly rebroadcast the broadcast messages flooding the network. Also, because the Layer 2 header does not support a time to live (TTL) value, if a frame is sent into a looped topology, it can loop forever (or until the loop is detected and disabled). A physical topology that contains switching or bridge loops may be attractive for redundancy reasons, yet a switched network must not have loops. One solution to allow for physical topology redundancy is to allow physical loops but create a loop-free logical topology using the shortest path bridging (SPB) protocol or the spanning tree protocols (STP) on the network switches. In cases where the logical topology is violated, or a physical connection is made incorrectly, an undesired network loop may be inadvertently created and cause issues on the computer network.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Loop-protect (LP) is a technique to detects layer-2 loops in a computer network. As mentioned above, loops in a network represent an error condition. This error condition is typically caused by an incorrect wiring of the network, for example a cable is plugged into the wrong port, or by a faulty network device (either hardware fault or configuration error).

In this disclosure, a layer-2 loop refers to a loop at layer 2 of the OSI model mentioned above. A first implementation of an example of this technique was introduced in U.S. Pat. No. 7,869,374, entitled "System and method for detecting a network loop," by Wakumoto et al., which is incorporated by reference herein in its entirety. The protocol has been extended in this disclosure and may be additionally useful on edge ports. Also, LP may further be enabled in aggregation and core layers that are used with multi-chassis link aggregation technology. Using disclosed techniques, administrators may be provided a prioritization capability with which to automatically address (e.g., perform automated recovery actions) a detected loop. In one example implementation, administrators may be able to configure a relative priority for each link that participates in the disclosed LP feature. Without a priority, administrators are unable to configure, ahead of a failure condition (e.g., loop detection), which link (e.g., of two or more links causing the loop) should be disabled first prior to disabling other links. In short, this disclosure outlines techniques and systems that include criteria to identify the "importance" of a link in which LP is configured. This disclosure addresses improvements to the art of network administration and the functioning of a computer network, in part, by allowing configuration of dynamic and static priority settings for layer-2 links in a networking device. This priority value may be a representation of the importance of the link, with higher priority value links being more important that links with a relative lower priority value.

In general, LP is a non-complicated loop-detection protocol, which works on layer-2 links. The loop-detection protocol monitors and detects, on each configured network device, instances of self-generated packets. That is, if a device receives a self-generated packet back on any link of the same switch, there will be a layer-2 loop. Because the layer-2 packets do not have a TTL (Time To Live) value, the packets will not die in a network with a loop. As a result, a single packet in a loop can utilize the full bandwidth of network and also disturb the CPU, in part, because of time "wasted" for processing that immortal packet. If there are no loops in the computer network, the self-generated packet will never return to the sending device (which is the expected non-error condition of a computer network). LP has a proprietary packet format as described further below (and in U.S. Pat. No. 7,869,374). This packet format uses a registered multicast mac address as destination mac address. Because it is a proprietary protocol, other vendor switches do not process or block these packets, so in any network communication device, LP packets will reach back to the sending switch in case of a loop. The above referenced network communication device may include many different devices with a varying range of hardware complexity (e.g., simple small capacity, minimally intelligent switches to large rack mounted highly automated network switches). LP allows system administrators to configure a receiver action on receiving an LP packet. This could be a "tx-disable" action (where the sending port will be disabled) or a "tx-rx-disable" action (where transmit and receive ports will be disabled—all ports that participate in loop), or a "do-not-disable" action (no ports disabled, but RMON LOGS/VLOGS or SNMP traps may be generated to notify the system administrator about the loop).

LP may be configured to send one packet in every configurable transmit interval time period, via all ports participating in the LP protocol. In a case where two ports are creating a loop, both ports will send an LP packet. This LP packet will then reach the other end of loop and will be processed by a CPU. Timing with respect to receiving these packets might not be in any specific order, as it could be affected by the other networking devices participating in loop, hardware to CPU copying delay, etc. In any case, with a non-prioritized implementation of LP, the first packet being processed "wins" and causes a disabling of the sending port associated with this "first" packet. The second packet will be ignored, as the sending port is now disabled, and the loop is resolved. This implementation of disabling a first processed packet may lead to undesirable results as an important port may be disabled when a non-important port is plugged into the computer network incorrectly and causes a loop detection. To address this situation, this disclosure augments previously available techniques of loop detection and corrective action by providing a system administrator the ability to configure a set of one or more parameters that can help in giving priority to a particular port. Further, disclosed techniques allow for a static priority that may be based on a configurable parameter and a calculation at startup or a dynamic priority that may adjust automatically based on run-time metrics. For example, metrics determined for network devices on the computer network for which the loop is detected. That is, metric values collected prior to loop detection.

In the deployments involving aggregation and core, there are uplinks and inter-switch links (ISLs) that are important in network connectivity. In case of a loop, it should be the links other than uplinks and ISLs that gets disabled in order to avoid the loop. Thus, the disclosed link priority for loop-protect allows system administrators to set link priority values such that links within a switch (or other network device) participating in a detected loop may have a proper one of that switches two links disabled (e.g., to remove the detected loop). That is, a priority value may be used to determine an intelligent way to address a detected loop so that a network device may properly disable one of its two ports that are participating in the detected network loop. In some implementations, a loop-protect feature may be implemented only on selected links of a network communication device.

Proposed Implementation Example

In an example implementation of the disclosed link priority for loop-protect technique, a "loop-protect link priority" parameter(s) may be associated with every port that participates in loop-protect. Specifically, a LOOP_PROTECT_MAX_LINK_PRIORITY may be the maximum value that can be configured, for example 255. LOOP_PROTECT_MIN_LINK_PRIORITY may be the minimum value, and in this example may be set to 0. The default priority for a given link may be set to another configurable value, for example LOOP_PROTECT_DEFAULT_LINK_PRIORITY may be set to 127. If a system administrator has not configured a priority for a particular link, the default value may be used.

In this example, when a loop detection is triggered, the priorities for each port identified as participating in a network loop may have their priority values compared prior to deciding which port to disable. The port with lesser priority value configured will be disabled first. The priority values associated with different ports on a device may be either static (e.g., based on a value set by a system administrator and remain constant) or dynamic (e.g., based on a run-time adjustment with respect to network conditions or port attributes as explained in more detail below).

Static Link Priority

To implement a static link priority, a system administrator may configure the value of a link priority based on pre-set configuration information. Once the priority value is configured, that value may not be adjusted further and will be used as originally set. In general, a link associated with a higher priority value may have a lesser chance of being automatically disabled. One exception to this rule is where a loop is created with an external device, or the other participating link determined to have an even higher priority value (e.g., has been designated as more important) than this link. Static priority implementations may also take into consideration values corresponding to bandwidth, or number of networks it is connecting (for example, it can be the number of tagged VLANs). In this implementation, for example, the static priority may be a constant to use in an equation to determine a link priority value at run-time. For example, a constant number multiplied by the number of tagged VLANs on the link such that a link supporting more tagged VLANs will have a higher priority than a link supporting less tagged VLANs (i.e., based on the multiplier factor of the static priority constant). Thus, even though a link may be configured with a static priority that link may not have a "fixed value" for its priority when used for comparison of priorities. Accordingly, a system administrator may be provided with an additional level of adjustment when implementing the disclosed link priority for loop-protect technique. Accordingly, this represents further enhancements to the functioning of network communication devices to provide improvements for system administrators when configuring computer networks.

Dynamic Link Priority

To implement a dynamic link priority, a system administrator may configure the value of a link priority based parameters adjusted to reflect a change or a parameter in network. That is, the dynamic link priority may be based on a calculation of different network parameters and their real-world values at the time of loop detection. In one example implementation, a dynamic link priority value may be based on bandwidth utilization. Note, utilization may approach 100% in cases where there is a loop. Accordingly, a stable state utilization (e.g., utilization prior to spike because of loop) may be used for this type of implementation. Thus, a higher stable state link utilization, will typically result in a higher priority value for that corresponding port. As a result, if a loop is formed by a highly utilized link and a lesser utilized link, the lesser utilized link will most likely have a lower priority value and be the candidate to be disabled automatically in accordance with the disclosed link priority for loop-protect technique. Utilizing this type of implementation, a system administrator may be able to configure priority values to impact to network traffic at the time of a loop detection. As another example, a dynamic link priority implementation may be used to determine a priority in proportion to uptime of individual ports. Thus, a port that is up and operational for long time will have a relatively higher priority as compared to a port that has come up recently. As a result, the port which gets disabled in this case of loop detection may be the recent port that got added. This technique for setting dynamic priority values may also tend to minimize network disturbance, as the existing traffic prior to the loop formation may not be adversely affected. In another implementation example, the dynamic priority may be calculated as a weighted sum of different parameters discussed above.

In examples when multiple loops may be detected, a priority parameter associated with different ports can be used to remove links that are common in multiple loops. For example, by reducing the link priority value when it is detected as part of a loop rather than immediately disabling a port. Both sending and receiving ports may have their associated priority value reduced by a configurable step amount (e.g., 50). Thus, after one iteration for at least two detected loops, the link which is common across multiple loops will have a lesser priority and increase the chance that it will be the candidate for disabling.

Having the above understanding of computer network loop issues, and in particular the disclosed link priority for loop-protect technique as may be used by any network device with multiple network interfaces, a detailed implementation example is explained below with reference to the figures. This example implementation uses a computer network with various end-user devices, switches, routers, and wireless access points, however, other types of network implementations may also benefit from the techniques of this disclosure.

Figure 1:
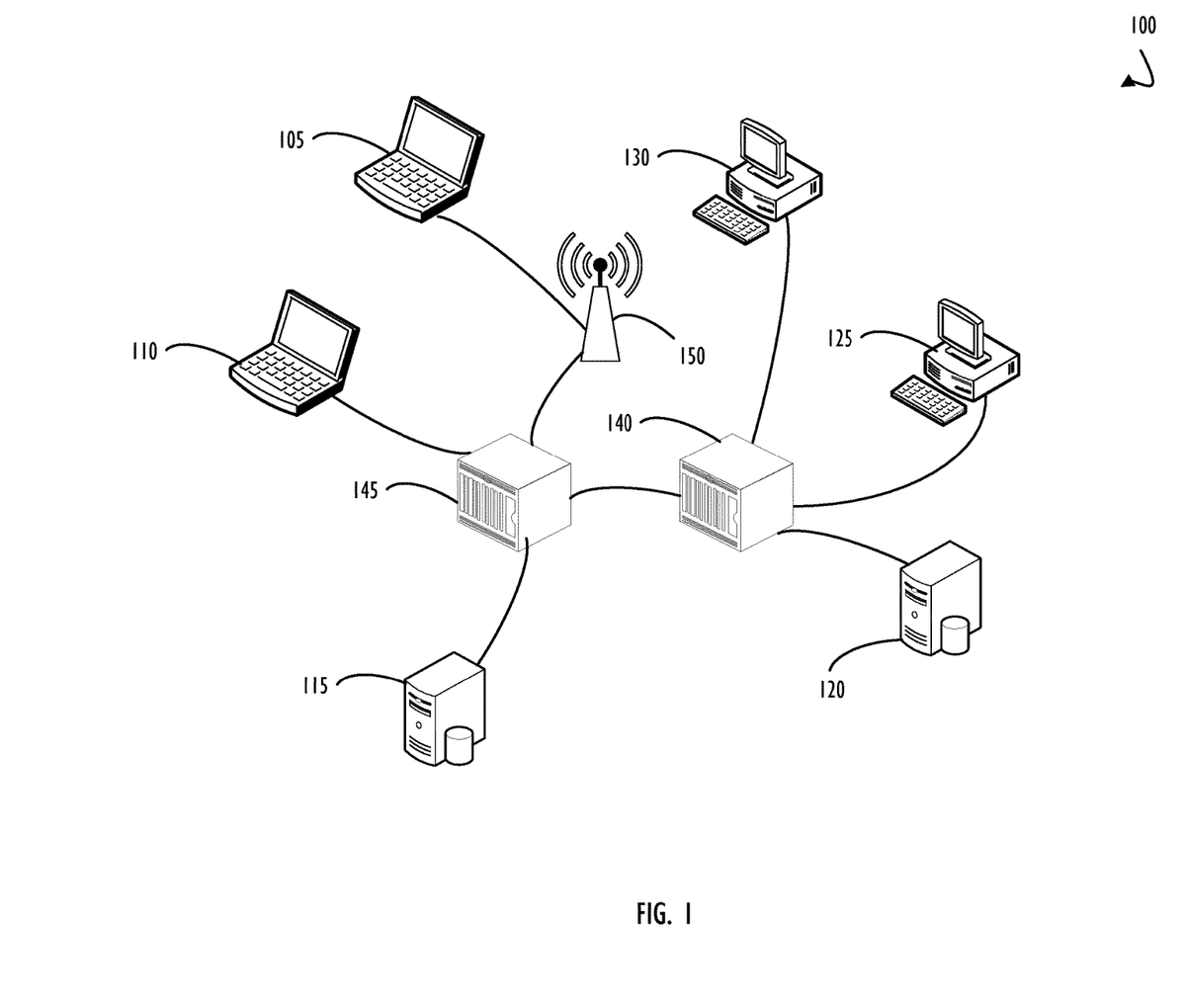
FIG. 1 is a functional block diagram representation of a network including six individual nodes connected to two switches that are connected together. In this example, there are no network loops.

Referring now to FIG. 1, a functional block diagram of network 100 including nine individual network nodes (of different device types) connected to two switches that are connected together. In this example, there are no network loops and traffic may be exchanged between devices as in normal operation. Computer lap-tops 105 and 110 represent an example of end-user devices that may be connected to computer network 110 in various ways. For example, computer lap-top 105 connects to network 100 of FIG. 1 via wireless access point 150, for example by forming a network association as outlined in the IEEE 802.11 specification for wireless networks. In this example, computer lap-top 110 is illustrated to connect to network 100 using a direct wired connection to network switch 145. Network switch 145 is, in turn, connected to network switch 140. Any number of network switches, routers, or other network communication devices (e.g., bridges) may be used to interconnect network devices but for simplicity only two switches (145 and 140) are illustrated in FIG. 1. Server computer 115 represents a computer that may provide storage or backend application support to end-user devices. For example, for network based applications, a lap-top (e.g., 105 or 110) may present a user interface portion of an application with other processing for that same application taking place on server computer 115. Server computer 120 represents another example of a network device that may be configured as a backup to server computer 115 or as an additional server for backend application support or storage. Desktop computers 125 and 130 illustrate other examples of devices that may implement end-user computers or provide some backend application support for other devices on network 100.

Figure 2:
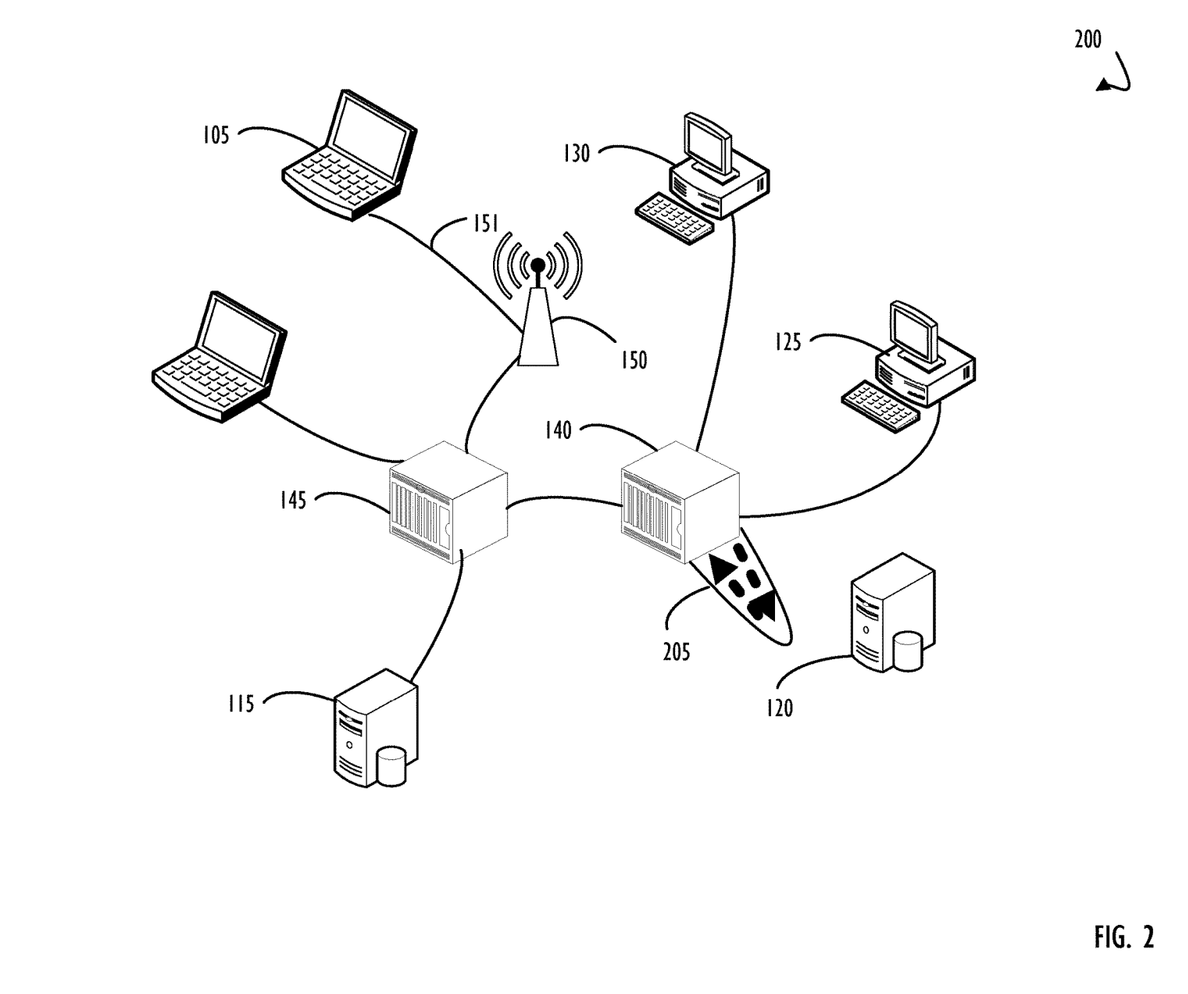
FIG. 2 is a block diagram representing one possible example of how an undesirable network loop may be inadvertently created (for example, due to a cabling error), detected, and addressed via the disclosed loop link priority technique, according to one or more disclosed implementations.

Referring now to FIG. 2, block diagram 200 represents one possible example of how an undesirable network loop may be inadvertently created (for example, due to a cabling error based on a change to network 100 of FIG. 1), detected, and addressed via the disclosed loop link priority technique, according to one or more disclosed implementations. In the example of FIG. 2, a new network connection is introduced as indicated by element 205. Element 205 illustrates that a cable, for example, may have been inadvertently plugged into switch 140 two times. That is, both ends of the cable were plugged into different ports on the same switch 140. Clearly, this situation may represent a user-error where a system administrator may have intended to plug one end of the cable into the switch and the other end into another network device (such as server computer 120). As shown in block diagram 200, server computer has been disconnected from the network because of this possible cabling error. As a result, server computer 120 may not be able to communicate on the network and packets sent out from switch 140 may return directly to switch 140 on another port of that switch 140. As indicated by the outbound and inbound arrows associated with element 205 (e.g., a looped network cable). In any case, this cabling error may cause disruption to the network until one of the two loop-back links is disabled (or both). In accordance with this disclosure, one of the two ports associated with this incorrect cabling may be disabled. The port disabled may be determined based on a relative priority value associated with each port in switch 140. This example represents a simple but common case where a network loop may be inadvertently created. Note, that the priority associated with each port does not need to be included inside the loop-detection packet, in part, because the packets being detected are self-generated. That is, a single network communication device (e.g., switch) both generates and receives the same loop protect packet and may use the relative priorities of two ports on that same device to determine which of the two ports should be affected by further processing (e.g., priority adjustment or disabled).

Figure 3:
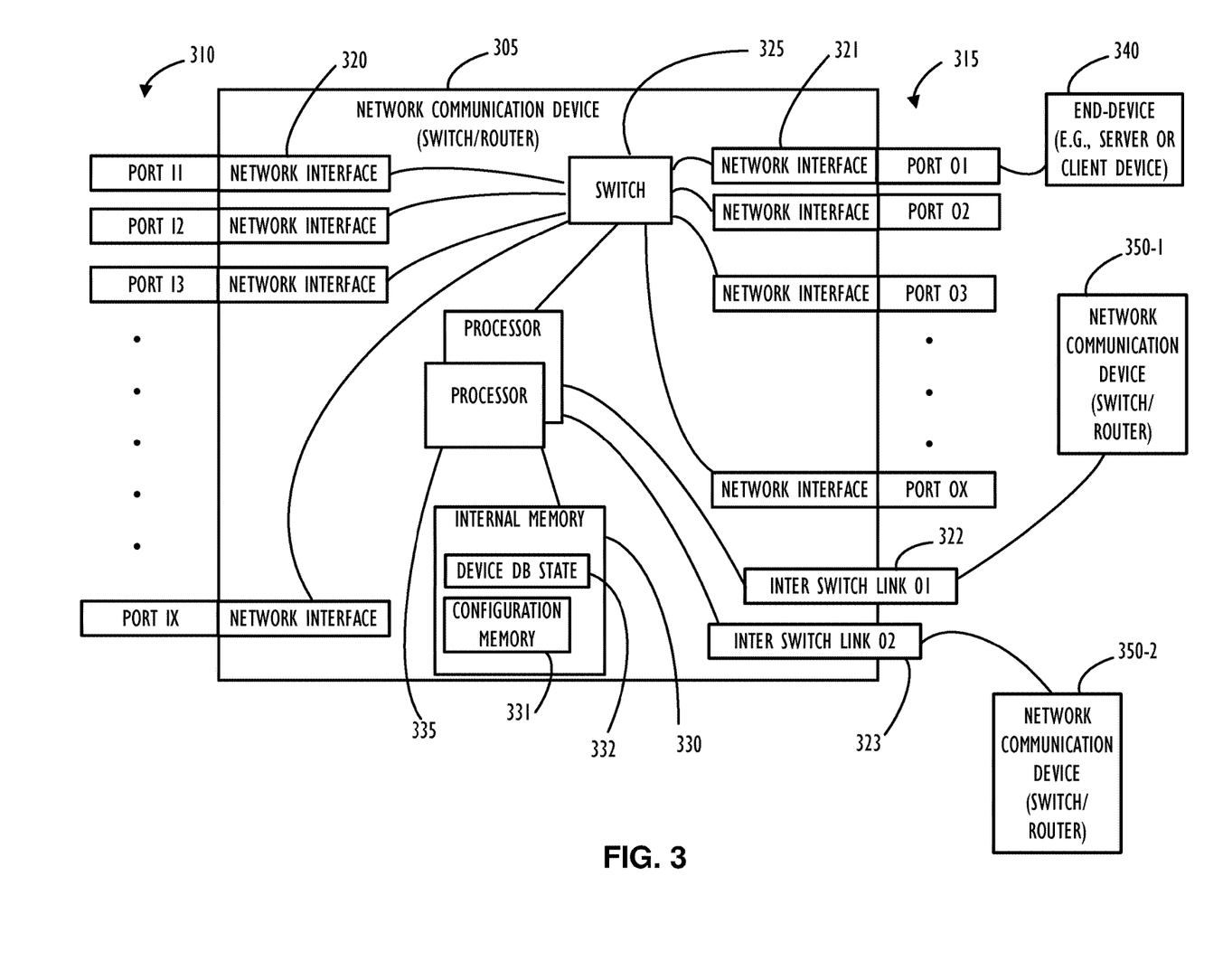
FIG. 3 is a block diagram representing one possible example of a network switch architecture including multiple interfaces of different types that may be assigned a link priority with respect to actions taken upon network loop detection, according to one or more disclosed implementations.

Referring now to FIG. 3, block diagram 300 illustrates one possible example of a network communication device 305 (e.g., switch or router) architecture including multiple interfaces of different types that may be assigned a link priority with respect to actions taken upon network loop detection, according to one or more disclosed implementations. Network communication device 305 represents a simplified network device to illustrate concepts of this disclosure. In general, network communication device 305 may include an internal switch 325 that communicatively connects a set of input ports 310 via a logical or physical network interface 320 to a set of output ports 315 that may also have an associated logical or physical network interface 321. The communication paths established by switch 325 may be controlled by one or more processors 335 (and possibly corresponding hardware logic) and the processors may obtain and store information in internal memory 340. Accordingly, the components of network device 305 described above may represent basic components that may be included in different types of computer devices beyond switches and routers that may benefit from the disclosed techniques.

In addition to these basic components, network communication device 305 includes two ISLs 322 and 323. Inter-link switches are components more traditionally found in a switch or router as opposed to more general computer network devices. ISL 01 322 is illustrated as connecting to network communication device 305-1 which may represent another instance of a switch/router that may be used to expand the processing capability beyond a single device. Similarly, ISL 02 323 is illustrated as connecting to network communication device 305-2. End-user device 340 is illustrated as connecting to a single port O1 of network communication device 305. Included within internal memory 320 are device DB state 332 which may represent a data base (or other storage mechanism) to maintain values associated with the state of a connected network or attributes (e.g., run-time values) associated with components of network communication device 305. For example, uptime or throughput values for different ports of network communication device 305 may be maintained in device DB state 332. Internal memory 331 also includes configuration memory 331 which may be used to store configuration parameters for network communication device 305. In particular, configuration memory 331 may include priority values for different ports and interfaces of network communication device 305. As explained above, these priority values may be utilized to determine which port of network communication device 305 may be disabled upon a loop detection and those priorities may indicate to disable a standard interface (such as the one to end-device 340) as opposed to an ISL link or uplink (not shown) of network communication device 305. Further, processor 335 may be used to calculate dynamic priorities based on different run-time values from device DB state 332 and possibly values from configuration memory 331 depending on how a dynamic priority calculation is defined (e.g., by a system administrator via configuration files).

Figure 4A:
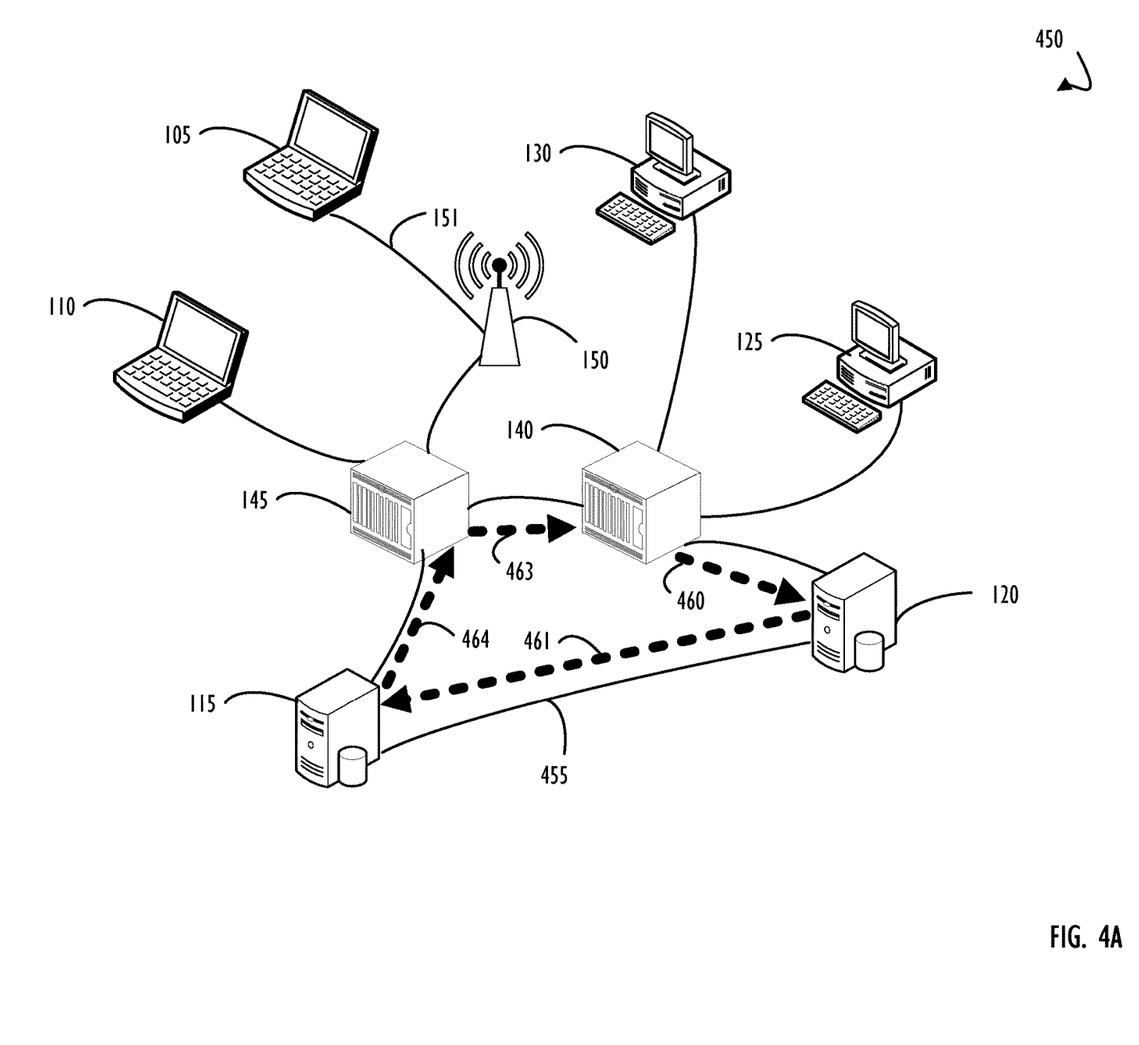
FIG. 4A is a block diagram representation of one possible example a network loop, for example created by a software or hardware configuration change with respect to the network of FIG. 2, according to one or more disclosed implementations.
Figure 4B:
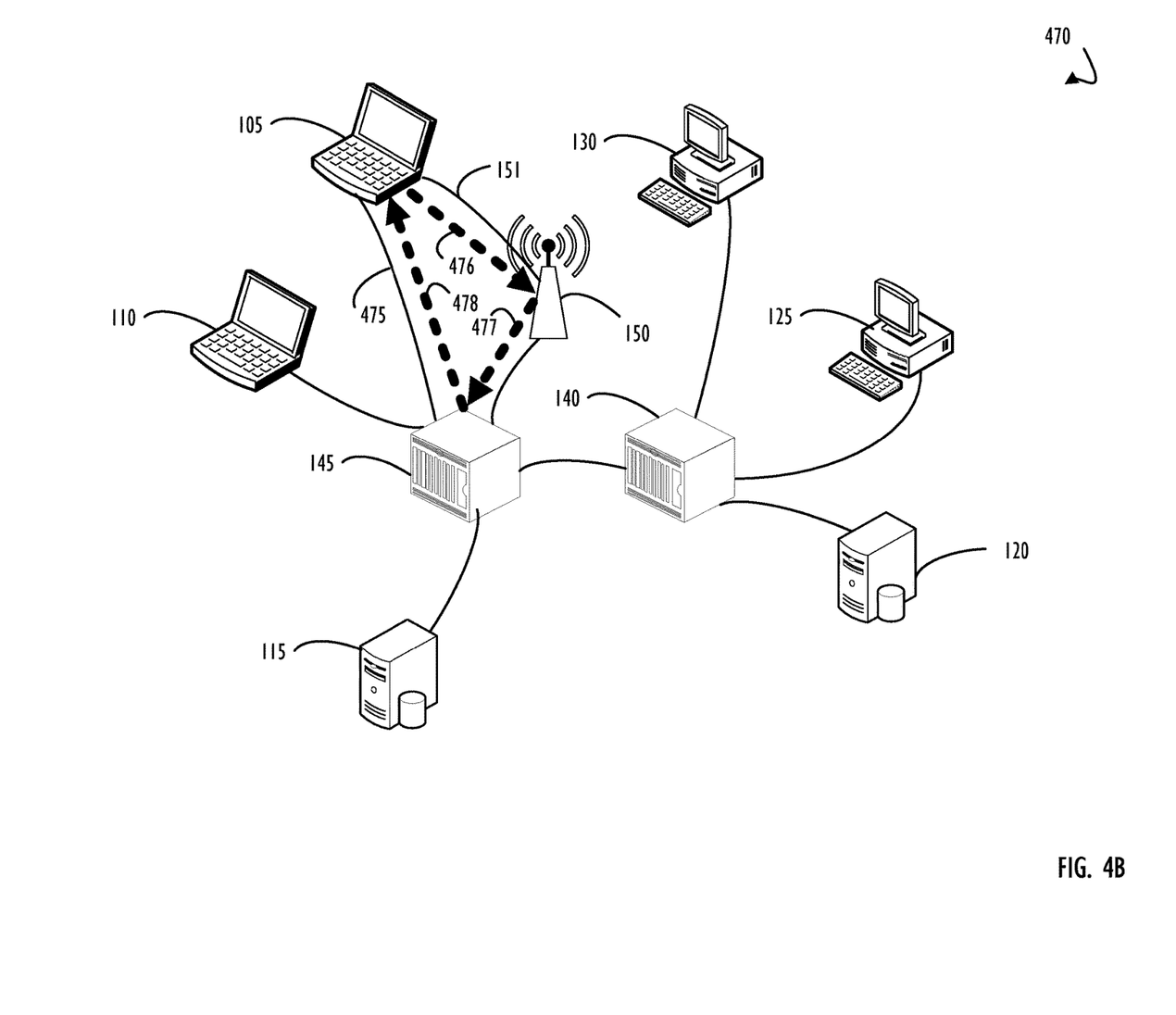
FIG. 4B is a block diagram representation of another possible example a network loop, for example created by a wireless device connecting to a network using a slight modification to the network of FIG. 2, according to one or more disclosed implementations.
Figure 4C:
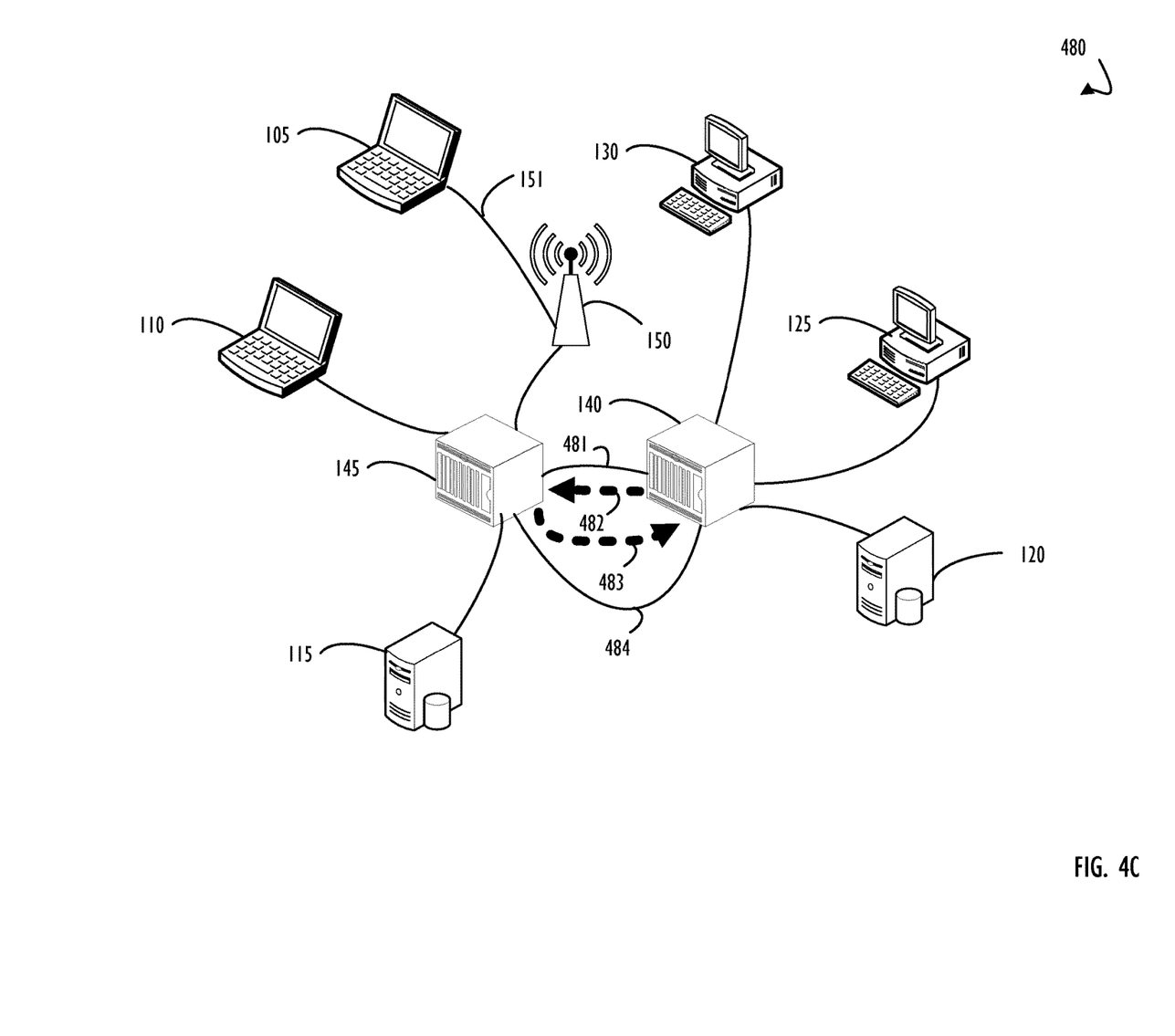
FIG. 4C is a block diagram representation of another possible example a network loop, for example created by cabling error with respect to two switches using a slight modification to the network of FIG. 2, according to one or more disclosed implementations.

Referring now to FIGS. 4A-B, FIG. 4A is a block diagram 450 representation of one possible example a network loop, for example created by a software or hardware configuration change with respect to network 100 of FIG. 1, according to one or more disclosed implementations. In this example, network link 455 between server computer 140 and server computer 115 is introduced. FIG. 4B is a block diagram 470 representation of another possible example of a network loop. For example, a loop may be created by a wireless device connecting to a network using a modification to the network 100 where a wired connection from lap-top computer 105 to switch 145 is added. FIG. 4C is a block diagram 480 representation of yet another possible example of a network loop. For example, a loop may be created by a cabling error between two switches of a network as illustrated with a modification to the network 100 where a wired connection from switch 140 to switch 145 is added.

In the example of FIG. 4A, a loop is created that may be detected from network switch 140. For example, network switch 140 may generate the above mentioned loop protect packet and transmit it on an outbound port as illustrated by arrow 460 toward server computer 140. As illustrated by arrow 461 that loop protect packet may traverse via network link 455 to server computer 115. Upon receipt at server computer 115 the loop protect packet may be forwarded (as illustrated by arrow 464) to network switch 145. Upon receipt at network switch 145, the loop protect packet may be returned (as indicated by arrow 463) to a different port (e.g., an input port different from the original outbound port) of switch 140. Thus, a network loop has been incorrectly formed and may be detected based on the loop protect packet returning to the device that originated that packet (e.g., via a different interface port). Upon receipt of the loop protect packet and a corresponding detection of a network loop, switch 140 may either disable the outbound port toward server computer 140 or the inbound port from switch 145 to address and remove the network loop. Based on priorities associated with these two ports, one of them may be selected to be disabled. In this example, it is likely that the connection between switch 145 and 140 may be maintained because it may be implemented using an ISL, may have a higher priority, or may have been in existence prior to introduction of the loop. Thus, server computer 140 will no longer have a direct connection to switch 140.

In a slight variation of the above example, server computer 140 may initially generate the loop protect packet. Thus, upon detection of the network loop when that packet returns to server computer 140, server computer 140 may make a determination to disable its link to switch 140 or, in this example, newly established network link 455 (which was responsible, in this example, for creating the network loop). If uptime were a parameter utilized in the determination, it is likely that server computer 140 would disable network link 455 to return the network to the configuration of network 100 with no network loops.

In the example of FIG. 4B, a network loop may be created by lap-top computer 105 connecting both wirelessly and via a wired connection to cause an alteration of network 100. Network link 475 may represent a wired connection established while the original wireless connect was already in place via access point 150. Accordingly, any of wireless access point 150, switch 145, or lap-top computer 105, may generate a loop-detect packet and make a determination as to which of their two ports participating in the network loop would be disabled. The loop of FIG. 4B is illustrated by arrows 476, 477, and 478. Again, if uptime were a parameter used in the priority determination, it is likely that newly introduced network link 475 would be disabled either at lap-top computer 105 or at switch 145 to remove the network loop. Other possibilities exist to inadvertently create network loops and the disclosed techniques may allow for system administrators to determine which devices detect and react to network loops while further configuring (e.g., through static or dynamic priorities) how those devices internally address any network loop that they detect.

In the example of FIG. 4C, a network loop may be created by a cabling error connecting two switches together and is illustrated as an alteration of network 100. Network link 484 may represent a wired connection established while the original connection 481 was already in place between switches 145 and 140. Accordingly, either of switch 140 or switch 145 may generate a loop-detect packet and make a determination as to which of their two ports participating in the network loop would be disabled. The loop of FIG. 4C is illustrated by arrows 482 and 483. Again, if uptime were a parameter used in the priority determination, it is likely that newly introduced network link 484 would be disabled either at switch 140 or at switch 145 to remove the network loop. Still other possibilities exist to inadvertently create network loops and the disclosed techniques may allow for system administrators to determine which devices detect and react to network loops while further configuring (e.g., through static or dynamic priorities) how those devices internally address any network loop that they detect.

Figure 5:
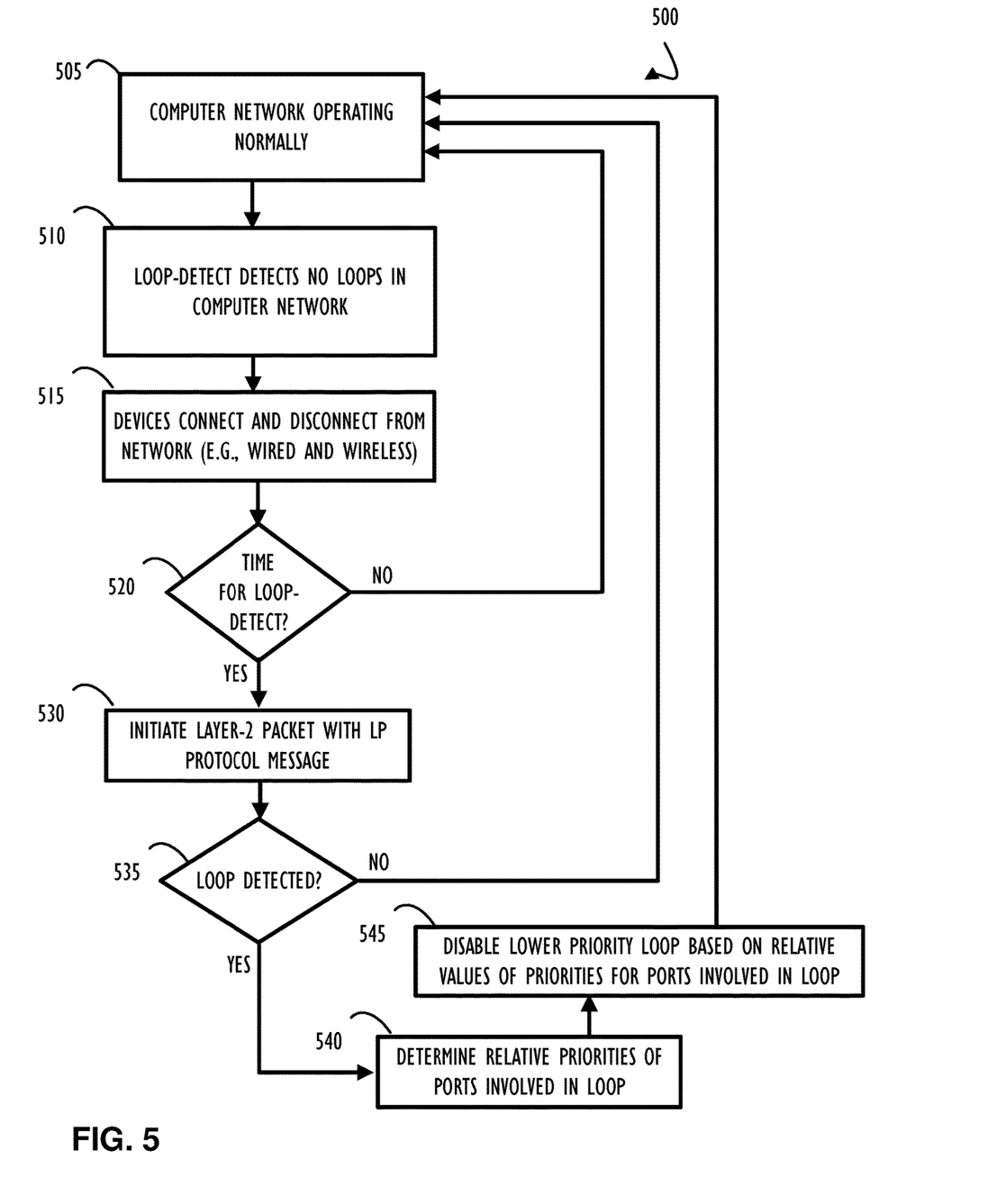
FIG. 5 is a flow chart representing a possible technique for a technique to detect and react to layer-2 loop conditions within a computer network (e.g., based on priorities of ports participating in the loop error condition), according to one or more disclosed implementations.

Referring now to FIG. 5, a flow chart is illustrated for use in describing a possible method 555 for detecting and responding to network loops, according to one or more disclosed implementations. Method 500 begins at block 505 where a computer network is operating normally (e.g., network 100 of FIG. 1 where there are not any loops). Block 510 indicates that a loop detect packet may be sent and not return to the sending device indicating that there are no detected loops within the network. Block 515 indicates that normal operation of the network may progress for a time with devices connecting and disconnecting from the network. For example, different end-user devices may be connected to the network based on users booting their devices or because of devices roaming into and out of range of a wireless access point associated with the network. Additionally, new servers or other computers may be added to a network over time. Decision 515 indicates that a device on the network (e.g., a switch or router) may determine that it is time to perform a periodic loop detect by initiating transmission of a loop check packet as discussed above. If it is not time, the NO prong of decision 515, flow returns to block 505 where continued operation of the network takes place. However, if it is time for a loop detect packet, the YES prong of decision 515, flow continues to block 530 where a layer-2 loop check packet using an LP protocol may be initiated from a network device as a network packet (e.g., network message). Depending on implementation details, only selected devices of a network may be configured to initiate loop check packets based on the LP protocol. Decision 535 determines if a loop is detected. For example, if the loop check packet makes it way through the network and arrives back at the originating device. If not, the NO prong of decision 535, flow returns to block 505 where the method 500 may repeat. However, if a loop is detected, the YES prong of decision 535, flow continues to block 540 where a determination of relative priorities of ports involved in the loop may be determined and compared. For example, dynamic priorities may be calculation and resulting priority values (either static, adjusted static, for dynamic) may be used to determine relative priorities for the identified ports (sending and receiving). Block 545 indicates that after calculations and comparisons, a lower priority loop on the loop detecting device may be disabled to address the computer network loop (e.g., eliminate a loop).

Figure 6:
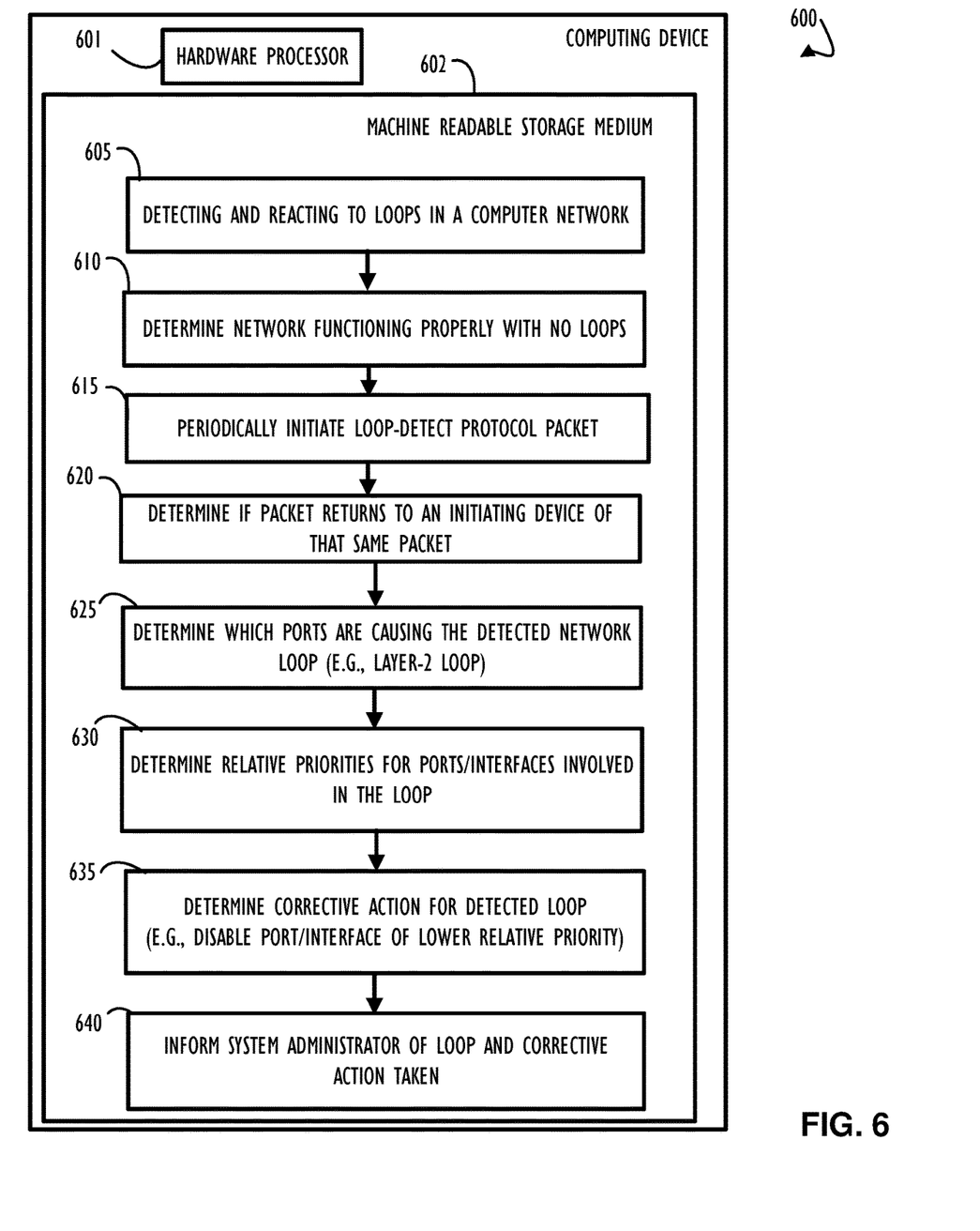
FIG. 6 is a block diagram representing a computing device implementing a technique to detect and react to layer-2 loop conditions within a computer network, according to one or more disclosed implementations.

FIG. 6 is a block diagram representing a computing device 600 implementing a technique to detect and react to layer-2 loop conditions within a computer network, according to one or more disclosed implementations. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed techniques to support heartbeats transmitted between members of a quorum. In this example, the instructions stored reflect a method similar to method 500 discussed above.

Beginning at block 605, the stored instruction may be directed toward detecting and eliminating network loops in a computer network. Block 610 indicates that a first determination may be optionally made that a computer network may be loop-free (for example network 100 of FIG. 1). Different devices in a given computer network may be configured with the disclosed loop detection techniques to make that initial determination. Block 615 indicates that loop-detect packets may be intermittently sent from selected devices to determine if any loops may have been introduced. For example, because of changes in wiring of network devices or software configuration adjustments to network communication devices connected to a network. Block 620 indicates that computing device 600 may receive a returning packet that was self-initiated. This may be considered an indication that a loop exists in the network because in a properly configured network a loop-detect packet will never return to the computer network device that originated that packet. Based on the network loop identification, block 625 indicates that a network communication device may determine which ports are causing the network loop (e.g., a layer-2 network loop). Block 630 indicates that a determination of relative priorities for the ports involved in the loop may be performed. For example, static priority values may be compared, dynamic priorities may be calculated and compared, or a combination thereof. Block 635 indicates that a determination may be made as to a corrective action relative to the detected loop and the priority comparison may be performed. For example, it may be determined by the computer network device, which of the two offending ports will be disabled to minimize expected impact to the computer network. Block 640 indicates that processing may be performed, at this stage or earlier in the process, to inform a system administrator of the loop detection, offending ports, corrective action taken, etc. In some implementations, an acknowledgement of corrective action may be requested from a system administrator or other end-user prior to, or as confirmation of the corrective action notification.

Figure 7:
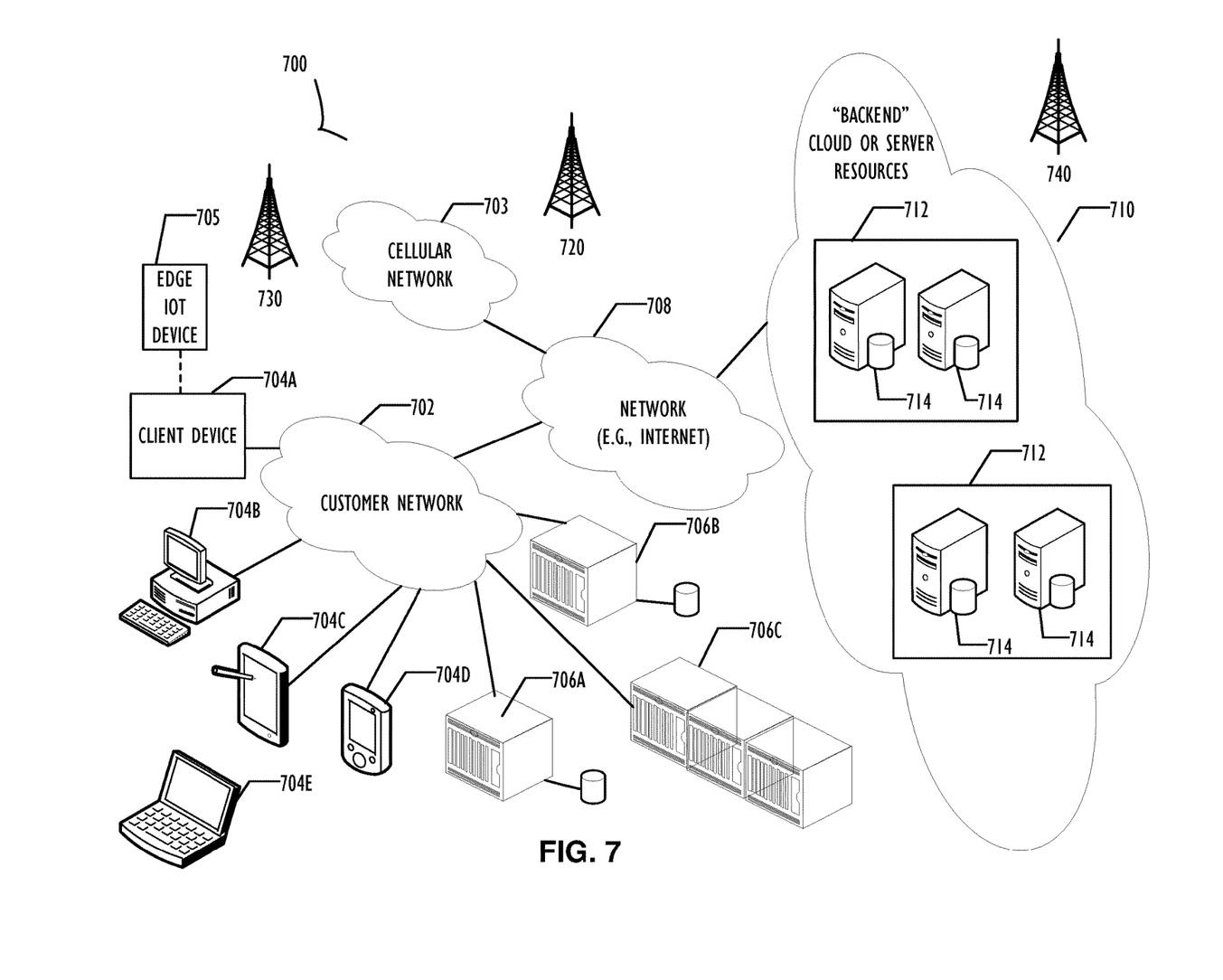
FIG. 7 represents a computer network infrastructure that may be used to implement all, or part of the disclosed loop-detect and recovery action computer processing associated with detection of a layer-2 loop, according to one or more disclosed implementations.

FIG. 7 represents a computer network infrastructure that may be used to implement all, or part of the disclosed loop-detect and recovery action computer processing associated with detection of a layer-2 loop, according to one or more disclosed implementations. Network infrastructure 700 includes a set of networks where implementations of the present disclosure may operate, including the disclosed prioritized recovery actions for loop detection. For example, there may be multiple nodes at different locations (e.g., data centers) and those data centers may communicate with each other through network infrastructure 700. Loops may be introduced inadvertently at different portions of a set of connected networks and may need to be addressed to maintain overall availability of networks for which the affected network may serve as a communication connection (e.g., a portion bridging additional networks). Network infrastructure 700 comprises a customer network 702, network 708, cellular network 703, and a cloud service provider network 710. Any of these networks may have nodes providing or receiving heartbeat messages or may contain a quorum data store configured in accordance with this disclosure. That is, each of these different networks may include one or more quorum redundant data storage implementations that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of a server-based application (or distributed application) because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server (e.g., a data storage server, application server, web server), access point, router, or other device configured to provide for local computational resources and/or facilitate communication amongst networks and devices. For example, local compute resources 706A-C may be one or more physical local hardware devices to support a layer-2 loop detection with prioritized recovery action capability as outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more rack-mounted blade servers or frames representing a scalable compute resource that may benefit from the techniques of this disclosure. Also, cloud service providers typically require near perfect uptime availability and may use the disclosed techniques, methods, and systems to provide that level of service.

Figure 8:
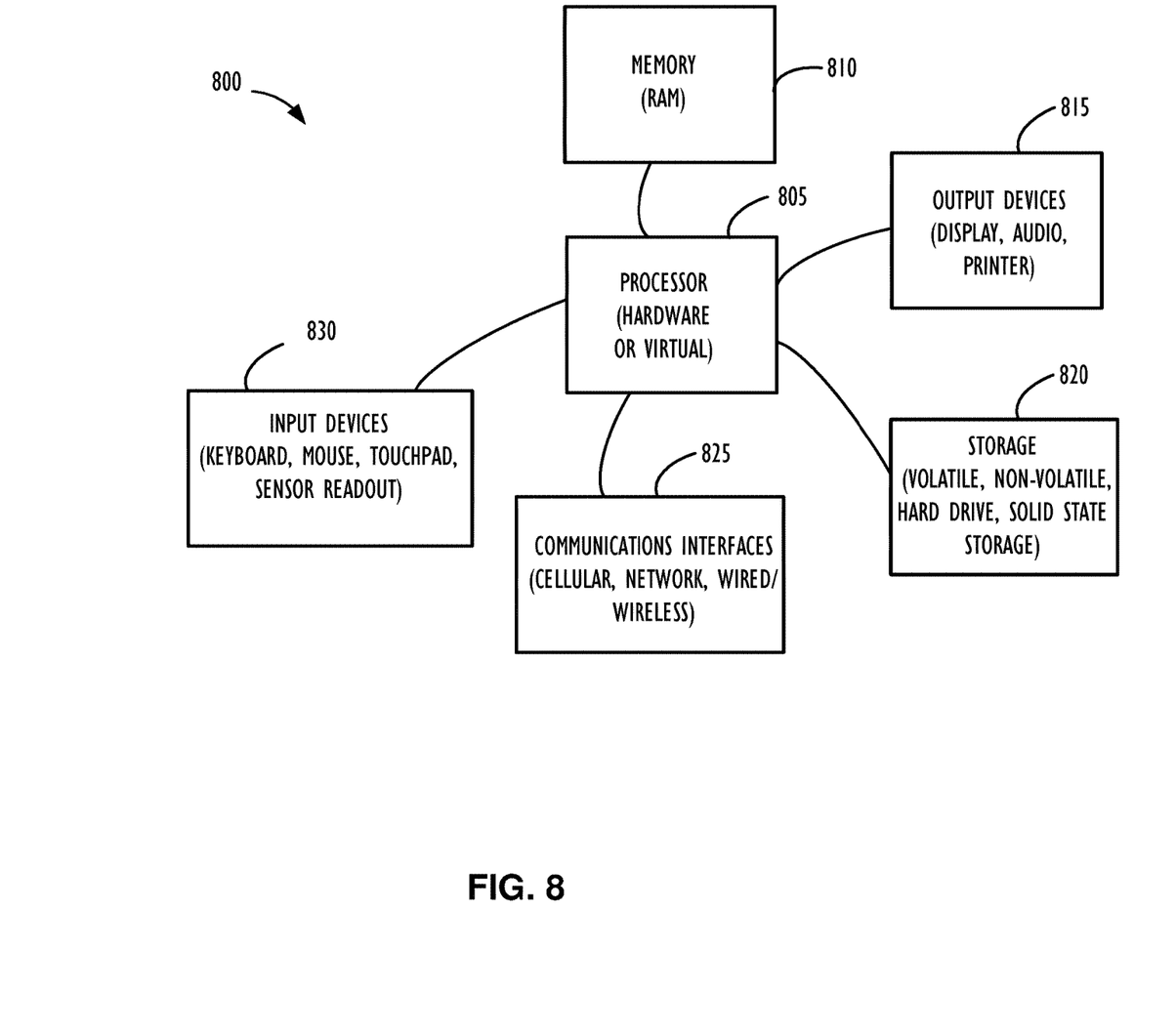
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device as illustrated in any of FIGS. 1-4, and 6-7, and include either hardware or virtual processor(s) depending on the level of abstraction of the computing device. Specifically, each of nodes, network communication devices, hosts, or compute resources discussed above may be considered instances of a computing device similar to computing device 800. Accordingly, multiple instances of computing device 800 and processor 805 may be used to implement the above disclosed methods (e.g., method 500 of FIG. 5) and systems for a loop-detection implementation. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) and a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple"

or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of disabling links within a computer network based on a loop link priority parameter, the method comprising:
    detecting a loop in a network in a network communication device having a first interface port associated with a first priority and a second interface port associated with a second priority;
    transmitting a first network packet as a loop check packet outbound from the network communication device via the first interface port;
    receiving a second network packet as an inbound network communication via the second interface port;
    identifying that contents of the second network packet is the same as the first network packet indicating the loop in the network;
    comparing the first priority with the second priority; and
    disabling one of the first interface port or the second interface port based on the comparison to remove the loop in the network.

2. The computer-implemented method of claim 1, wherein the first priority and the second priority are based on system administrator supplied configuration settings.

3. The computer-implemented method of claim 1, wherein at least one of the first priority and the second priority is a default priority.

4. The computer-implemented method of claim 1, wherein the first priority is a based on a static priority and the second priority is based on a dynamic priority.

5. The computer-implemented method of claim 4, wherein the dynamic priority is determined, in part, based on throughput of the first interface port.

6. The computer-implemented method of claim 1, wherein the first priority and the second priority are based on respective dynamic priorities.

7. The computer-implemented method of claim 6, wherein the first priority and the second priority are based, in part, on uptime of their respective interface port.

8. The computer-implemented method of claim 6, wherein the first priority and the second priority are based, in part, on throughput of their respective interface port.

9. The computer-implemented method of claim 6, wherein the first priority and the second priority are based, in part, on a calculation derived using both uptime and throughput of each respective interface port.

10. The computer-implemented method of claim 1, further comprising:
    reducing at least one of the first priority or the second priority prior to disabling either network interface port;
    receiving a second indication of the network loop; and
    using a reduced priority when comparing the first priority to the second priority.

11. A computer device, comprising:
    a hardware processor;
    a first network port communicatively coupled to the first hardware processor and a first network;
    a second network port communicatively coupled to the first hardware processor and the first network;
    a persistent memory storage area communicatively coupled to the first hardware processor; and
    an instruction memory area communicatively coupled to the first hardware processor, wherein the instruction memory area stores instructions, that when executed by the first hardware processor, cause the first hardware processor to:
        detect a loop in a network in the first network port associated with a first priority and the second network port associated with a second priority;
        transmit a first network packet as a loop check packet outbound from the network communication device via the first network port;
        receive a second network packet as an inbound network communication via the second network port;
        identify that contents of the second network packet is the same as the first network packet indicating the loop in the network;
        compare the first priority with the second priority; and
        disable one of the first network port or the second network port based on the comparison to remove the loop in the network.

12. The computer device of claim 11, wherein the first priority and the second priority are based on system administrator supplied configuration settings.

13. The computer device of claim 11, wherein at least one of the first priority and the second priority is a default priority.

14. The computer device of claim 11, wherein the first priority is a based on a static priority and the second priority is based on a dynamic priority.

15. The computer device of claim 14, wherein the dynamic priority is determined, in part, based on throughput of the first interface port.

16. A non-transitory computer readable medium comprising computer executable instructions stored thereon that when executed by one or more hardware processors, cause the one or more hardware processors to:
    detect a loop in a network in a network communication device having a first interface port associated with a first priority and a second interface port associated with a second priority;
    transmit a first network packet as a loop check packet outbound from the network communication device via the first interface port;
    receive a second network packet as an inbound network communication via the second interface port;
    identify that contents of the second network packet is the same as the first network packet indicating the loop in the network;
    compare the first priority with the second priority; and
    disable one of the first interface port or the second interface port based on the comparison to remove the loop in the network.

17. The non-transitory computer readable medium of claim 16, wherein the first priority and the second priority are based on respective dynamic priorities.

18. The non-transitory computer readable medium of claim 17, wherein the first priority and the second priority are based, in part, on uptime of their respective interface port.

19. The non-transitory computer readable medium of claim 17, wherein the first priority and the second priority are based, in part, on throughput of their respective interface port.

20. The non-transitory computer readable medium of claim 17, wherein the first priority and the second priority are based, in part, on a calculation derived using both uptime and throughput of each respective interface port.

* * * * *